US006029513A

United States Patent [19]

Kikori et al.

[11] Patent Number: 6,029,513

[45] Date of Patent: Feb. 29, 2000

[54] METHOD AND APPARATUS FOR CONTROLLING THROTTLE VALVE

[75] Inventors: Shigeo Kikori, Toyota; Mitsuru Takada, Aichi-gun, both of Japan

[73] Assignee: Toyota Jidosha Kabushiki Kaisha, Toyota, Japan

[21] Appl. No.: 08/954,529

[22] Filed: Oct. 20, 1997

[30] Foreign Application Priority Data

Oct. 22, 1996 [JP] Japan .................................... 8-279318

[51] Int. Cl.[7] .................................................... G01M 15/00

[52] U.S. Cl. ........................................... 73/118.2; 123/337

[58] Field of Search ................................ 73/118.1, 118.2, 73/116, 117.3, 117.2; 123/337, 397, 399, 400

[56] References Cited

U.S. PATENT DOCUMENTS

| | | | |
|---|---|---|---|
| 5,076,231 | 12/1991 | Buchl | 123/399 |
| 5,133,321 | 7/1992 | Hering et al. | 123/399 |
| 5,201,291 | 4/1993 | Katoh et al. | 123/399 |
| 5,297,522 | 3/1994 | Buchl | 123/399 |

FOREIGN PATENT DOCUMENTS

| | | |
|---|---|---|
| 1-167441 | 7/1989 | Japan . |
| 8-23312 | 3/1996 | Japan . |

*Primary Examiner*—Eric S. McCall
*Attorney, Agent, or Firm*—Kenyon & Kenyon

[57] ABSTRACT

An apparatus for controlling an opening of a throttle valve to adjust an amount of air flow led into an internal combustion engine mounted on a vehicle. A depression sensor detects the degree of depression of an accelerator pedal. An electric component is provided for electrically adjusting the opening of the throttle valve based on the depression of the gas pedal. A mechanical component is provided for adjusting the opening of the throttle valve in response to the depression of the accelerator pedal. The mechanical component is rendered operable when the electric component fails to control the opening of the throttle valve. An electric control unit (ECU) prohibits the electric component from resuming control of the throttle valve until a certain condition is met, such as stoppage of the engine or the entire vehicle, even if the electric component is capable of controlling the throttle valve. In another embodiment, the ECU prohibits the electric component from resuming control of the throttle valve until a transmission shift position of neutral or park is detected.

10 Claims, 9 Drawing Sheets

METHOD AND APPARATUS FOR CONTROLLING THROTTLE VALVE

BACKGROUND OF THE INVENTION

The present invention generally relates to an apparatus for controlling a throttle valve in vehicles. More particularly, the present invention pertains to a throttle valve controlling apparatus that includes a component for electrically controlling the opening of a throttle valve and a component for mechanically controlling the throttle valve when the electric component fails to control the throttle valve.

A typical engine has throttle valve provided in its intake air pipe to control the amount of air drawn into the engine. In one system for controlling the throttle valve opening TA, the throttle valve is coupled to a gas pedal by a wire. The throttle opening TA is mechanically controlled in accordance with the degree of gas pedal depression PA. Therefore, there is a one-to-one relationship between the throttle opening TA and the gas pedal depression amount PA at any given running state of the engine.

Recently, apparatuses for electrically controlling the throttle opening TA have been proposed. This type of apparatus includes a computer for computing a target throttle opening based on the degree of gas pedal depression PA and several parameters indicating the running state of the engine. The computer controls an actuator (for example, an electric motor) of the throttle valve such that the throttle opening TA matches a target throttle opening.

In this type of throttle apparatus, the relationship between the throttle opening TA and the gas pedal depression amount PA is arbitrarily determined. In other words, the throttle opening TA can be altered such that the opening TA is suitable for the running state of the engine, and is not necessarily directly proportional to the degree of pedal depression.

However, when a malfunction occurs in the throttle valve, for example, if the throttle valve sticks to the wall of the intake pipe due to deposits formed in the pipe, the actuator may fail to properly control the throttle opening TA.

Japanese Examined Patent Publication No. 8-23312 discloses an apparatus for dealing with this problem. This apparatus has a mechanical component that couples a gas pedal with to the throttle valve with a wire. When the actuator fails to control the throttle opening TA, the mechanical component takes over the control of the throttle opening TA. FIG. 9 illustrates a throttle valve controlling apparatus that includes such a mechanical component.

This apparatus includes a shaft 81 rotatably supported in an intake air pipe 80, a throttle valve 82 secured to the shaft 81, a motor 83 for controlling the opening of the valve 82, a controller 84, a sensor 85 for detecting the degree of depression of the gas pedal, and a sensor 86 for detecting opening or the throttle valve 82. The controller 84 computes a target throttle opening based on a signal from the gas pedal sensor 85 and actuates the motor 83 such that the throttle opening TA detected by the sensor 86 matches the target opening.

The shaft 81 is secured to a first lever 87, which is urged by a spring 88 in a direction closing the throttle valve 82. A second lever 89, which is rotatably supported on the shaft 81, is coupled to a third lever 91 by a wire 90. Pressing the gas pedal 92 over a predetermined amount causes the pedal 92 to contact the third lever 91 thereby drawing the wire 90. This causes the second lever 89 to contact the first lever 87 and rotates the first lever 87 integrally with the second lever 89 against the force of the spring 88. In this manner, the throttle valve 82 is opened by manipulation of the gas pedal 92.

If the throttle valve 82 sticks to the inner wall of the intake air pipe 80, it is assumed that, even if actuated by the controller 84, the motor 83 will fail to change the throttle opening TA. The controller 84 then judges that the valve 82 is stuck on the inner wall of the pipe 80 and controls the motor 83 to generate the maximum torque. The force of the maximum torque of the motor 83 alone or the combined force of the maximum torque and rotational force applied on the shaft 81 by cooperation of the levers 87, 89 and 91 increases the throttle opening TA. When the increase in the throttle opening TA is detected by the throttle opening sensor 86, the controller 84 judges that the valve 82 is free from the inner wall of the pipe 80. From the time of this judgment, the controller 84 temporarily stops controlling the valve 82 with the motor 83 until the gas pedal 92 is separated from the third lever 91 by the driver's manipulation of the pedal 92.

In this manner, the apparatus frees the throttle valve 82 from the wall of the pipe 80. At this time, the controller 84 stops controlling the throttle valve 82 with the motor 83. Therefore, even if the driver significantly increases the pedal depression PA, the opening TA of the valve 82 is not increased accordingly. This keeps the engine speed lower than the speed that corresponds to the increased amount of pedal depression PA when the valve 82 is actuated by the motor 83.

However, this apparatus has the following drawbacks.

The throttle opening TA is increased for freeing the valve 82 from the wall of the pipe 80. Therefore, when the motor 83 resumes controlling the throttle valve 82 after the valve 82 is controlled by the levers 87, 89 and 91, the vehicle is likely to be moving. This may result in an unpredictable running state of the vehicle.

That is, the same amount of depression of the gas pedal 92 results in different openings of the throttle valve 82 at a time immediately before the motor 83 resumes controlling the valve 82 and at a time immediately after the motor 83 resumes controlling the valve 82. Therefore, if the valve 82 sticks to the pipe 80 and is thereafter freed, the driver may be disturbed due to the unexpected change in the relationship between the degree of depression of the gas pedal 92 and the engine speed.

SUMMARY OF THE INVENTION

Accordingly, it is an objective of the present invention to prevent a driver from experiencing uncomfortable and unpredictable relationship between depression amount of a gas pedal and the engine speed when an electric component resumes controlling the throttle valve after a mechanical component controls the opening of the throttle valve.

To achieve above objective, the present invention provides an apparatus for controlling the opening of a throttle valve to adjust the amount of air flow to an internal combustion engine mounted on a vehicle. An acceleration pedal is arranged to be depressed by a driver. A depression sensor is provided for detecting the degree of depression of the acceleration pedal. An electric component is provided for adjusting the opening of the throttle valve with an electric power source based on the detected degree of depression of the acceleration pedal. A mechanical component is provided for adjusting the opening of the throttle valve in response to the degree of depression of the acceleration pedal. The mechanical component is rendered operable when the electric component fails to control the opening of the throttle valve. A first sensor is provided for detecting a predetermined condition of the vehicle. A controller device is provided for returning control of the throttle valve to the electric component, after a period of control of the throttle valve by the mechanical component, only when the predetermined condition is detected by the first sensor.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

A first embodiment of the present invention will now be described with reference to FIGS. 1 to 4.

Figure 1:
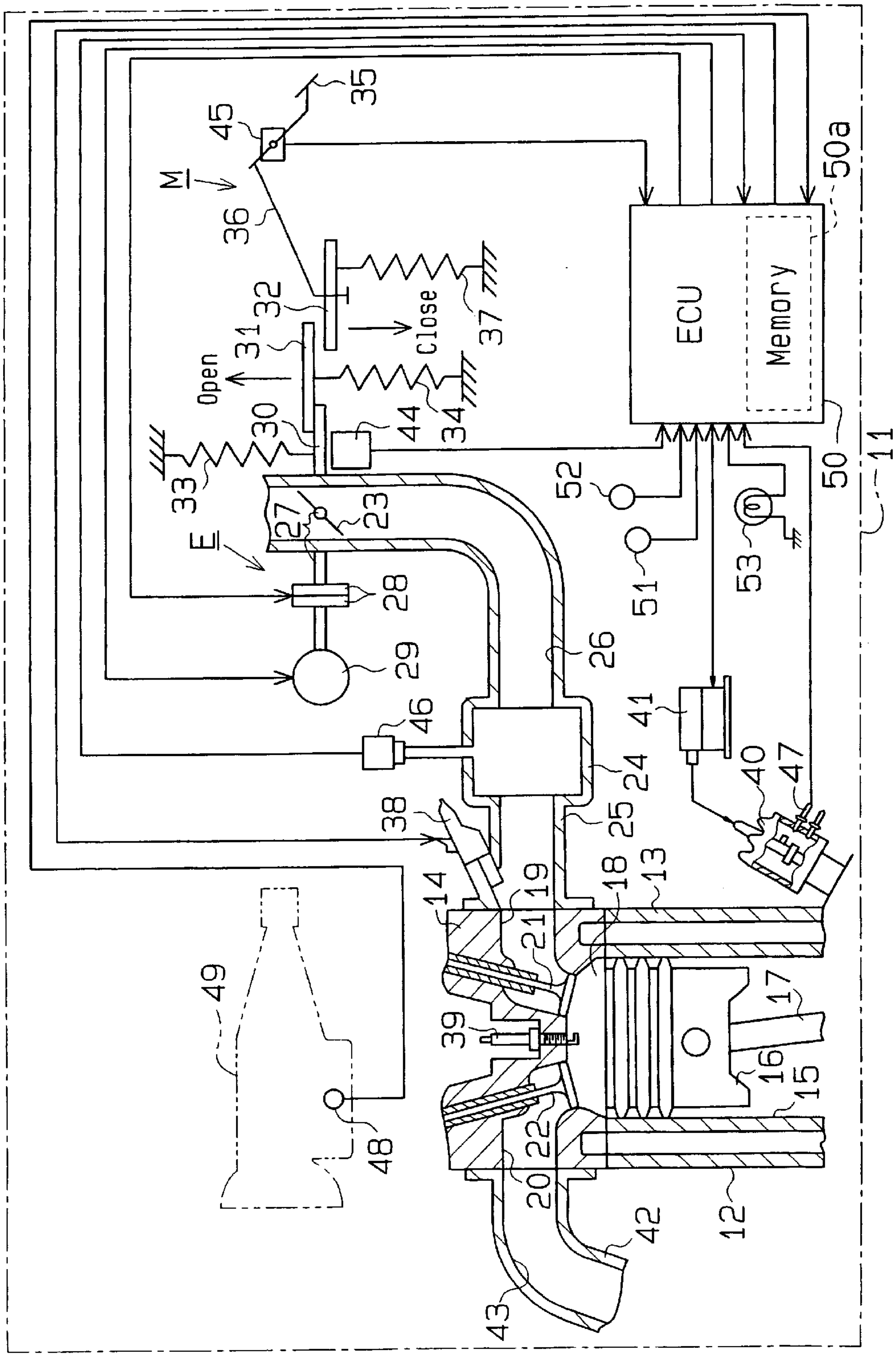
FIG. 1 is a schematic diagram illustrating an on-vehicle control apparatus according to a first embodiment of the present invention.

As shown in FIG. 1 a multi-cylinder gasoline engine 12 mounted on a vehicle 11 includes a cylinder block 13 and a cylinder head 14. A plurality of cylinder bores 15 (only one is shown) are defined in the cylinder block 13. A piston 16 is located in each cylinder bore 15. A connecting rod 17 couples each piston 16 to a crankshaft (not shown). Reciprocation of the pistons 16 is converted into rotation of a crankshaft by the rod 17.

Each cylinder bore 15, cylinder head 14 and each piston 16 define a combustion chamber 18. A plurality of intake ports 19 (only one is shown) and a plurality of exhaust port 20 (only one is shown) are defined in the cylinder head 14. Each suction port 19 and each exhaust port 20 are communicated with one of the combustion chambers 18. A suction valve 21 selectively opens and closes each intake port 19. Likewise, an exhaust valve 22 selectively opens and closes each exhaust port 20.

The intake ports 19 are connected to an intake passage 26 by an intake manifold 25. A throttle valve 23 and a surge tank 24 are provided in the intake passage 26. The intake passage 26 leads the outside air into each combustion chamber 18. The upstream side of the valve 23 is connected to the downstream side by a bypass passage (not shown). An idle speed control valve (next shown) is provided in the bypass passage. When the throttle valve 23 is fully closed, the idle speed control valve maintains a certain flow of intake air to the engine 12 and thus stabilizes the idling of the engine 12.

The throttle valve 23 is rotatably supported in the intake passage 26 by an axle 27. A system for operating the throttle valve 23 includes an electric component E and a mechanical component M. The amount of airflow in the intake passage 26 (intake amount) is controlled by the inclination of the throttle valve 23, or the throttle opening TA.

Figure 2:
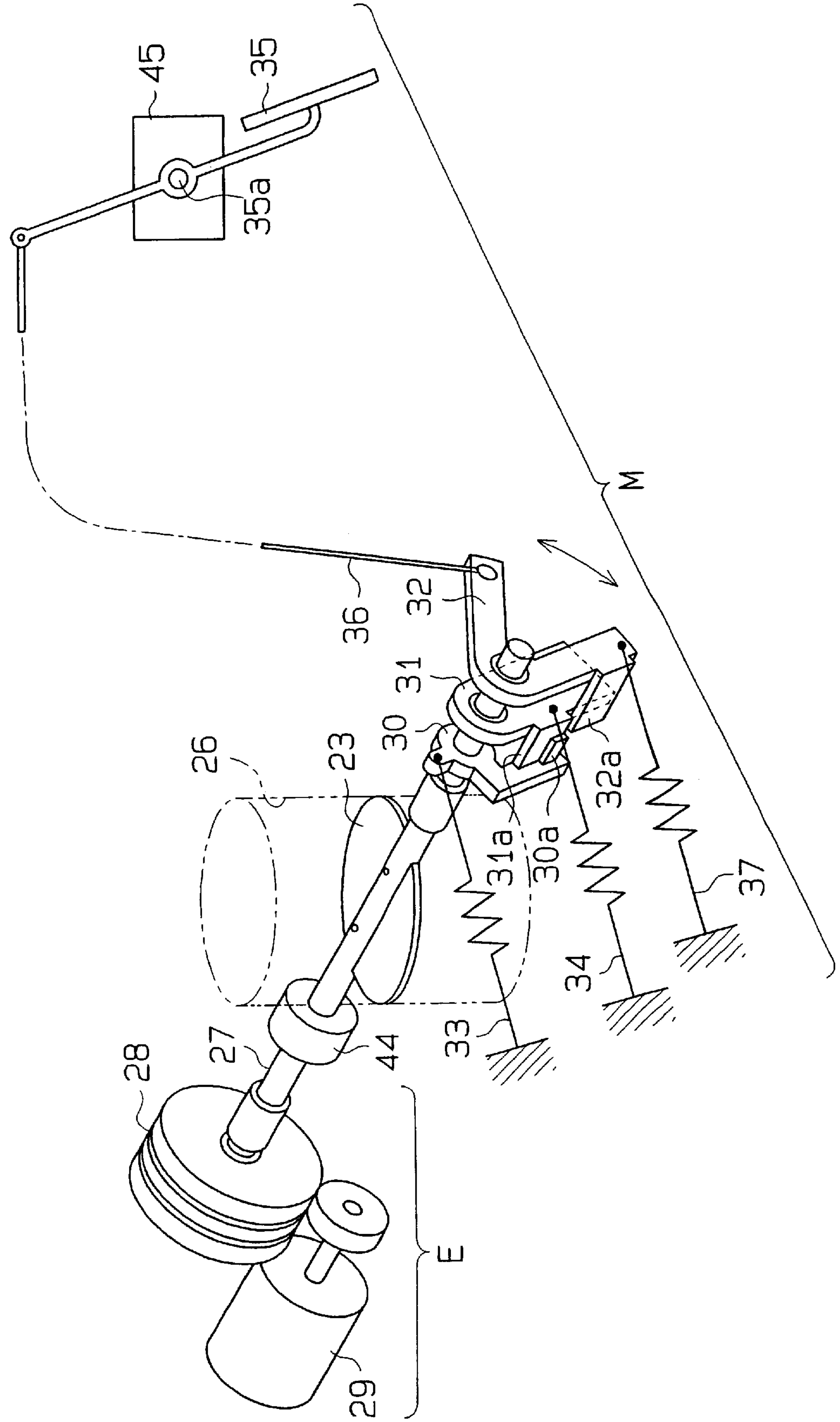
FIG. 2 is a diagrammatic perspective view illustrating components for actuating a throttle valve.

The components E and M for actuating the throttle valve 23 will now be described with reference to FIG. 2. An electromagnetic clutch 28 is fixed to an end (left end as viewed in FIG. 2) of the axle 27. The electric motor 29 is operably coupled to the clutch 28 and a throttle valve opening sensor 44 is located on the axle 27 between the valve 23 and the clutch 28. An interlocking lever 30, an intermediate lever 31 and a throttle lever 32 are provided on the other side of the axle 27.

The interlocking lever 30 is fixed to the axle 27 and is urged by a spring 33 in a direction to open the throttle valve 23. The intermediate lever 31 rotates relative to the axle 27 and is urged by a spring 34 in a direction to close the valve 23. Specifically, the levers 30 and 31 have projections **30*a* and 31*a*, respectively. Rotation of the lever 31 in the direction to close the valve 23 is transmitted to the lever 30, which is fixed to the axle 27, by contact between the projections 30*a* and 31*a*. The moment of the lever 31 is greater than the opposite moment of the lever 30. This is accomplished by making the spring force of the spring 34 greater than that of the spring 33 Therefore, when the clutch 28 is de-activated and disconnects the motor 29 from the axle 27, the throttle valve 23 is closed by the force of the spring 34. The clutch 28, the motor 29, the interlocking lever 30, the intermediate lever 31 and the springs 33, 34** are included in the electric component E.

A gas pedal 35 is provided in the passenger compartment of the vehicle 11. The pedal 35 pivots about an axis **35*a*. The throttle lever 32 is rotatably supported on the axle 27 and is operably coupled to the gas pedal 35 with a wire 36. The throttle lever 32 is urged by a spring 37 in a direction closing the throttle valve 23. A projection 32*a* is formed on the throttle lever 32. The projection 32*a* is normally separated from the intermediate lever 31. The throttle lever 32 contacts the intermediate lever 31 only when the clutch 28 is de-activated to disconnect the axle 27 from the motor 29 and the gas pedal 35 is pressed against the force of the spring 37 over a predetermined amount (i.e., when the gas pedal depression amount PA is equal to or greater than a predetermined value). The throttle lever 32, the wire 36 and the spring 37** are included in the mechanical component M.

Figure 3:
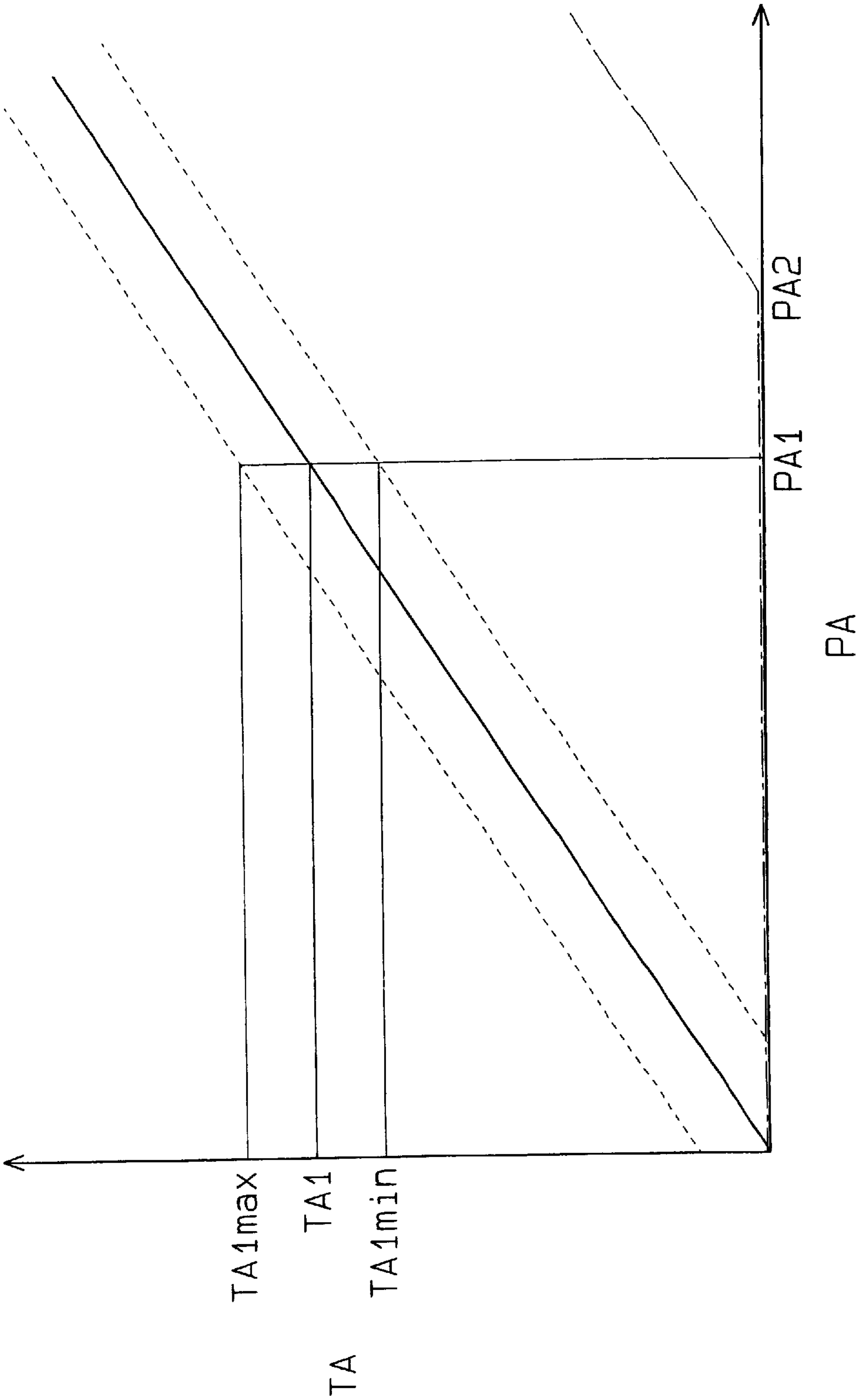
FIG. 3 is a graph showing the relationship between the gas pedal depression and the throttle opening when the valve is mechanically controlled and when the valve is electrically controlled.

Referring to FIG. 3, the relationship between the gas pedal depression amount PA and the throttle opening TA will now be described. The continuous diagonal line in FIG. 3 represents the relationship between TA and PA when there is no malfunction in the electric component E. "Malfunction in the electric component E" in this specification refers to a state in which the electric component E is unable to control the throttle valve 23 properly. Such a malfunction includes a breakdown of throttle sensor 44, the gas pedal sensor 45 or the motor 29. Another cause of a malfunction includes sticking of the periphery of the throttle valve 23 to the inner wall of the intake passage 26 whereby the motor 29 is unable to properly rotate the valve 23. As shown in FIG. 3, the throttle opening TA is linearly increased in accordance with the increase in the gas pedal depression amount PA.

As illustrated in FIG. 3, the throttle opening TA that corresponds to a given gas pedal depression amount PA varies in a range between the broken lines in accordance with the running state of the engine 12. For example, if the gas pedal depression amount PA is PA1 in FIG. 3, the throttle opening TA corresponding to the value PA1 varies from the minimum value TA1min to the maximum value TA1max.

On the other hand, the alternate long and short dash line in FIG. 3 shown the relationship between the throttle opening TA and the gas pedal depression amount PA when the throttle valve 23 is actuated by the mechanical component M. When the pedal depression amount PA is equal to or smaller than a predetermined value PA2, the throttle opening is zero (For visibility, the dashed line is a slightly offset from the PA axis). When the pedal depression amount PA exceeds the value PA2, the projection 32*a* of the throttle lever 32 contacts the intermediate lever 31 and the throttle opening TA is gradually increased.

As shown in FIG. 3, if the electric component E takes over control of the throttle valve 23 from the mechanical component M, the throttle opening TA is significantly increased.

As illustrated in FIG. 1, the intake manifold 25 has a plurality of injectors 38 (only one is shown), each of which corresponds to one of the combustion chambers 18. Each injector 38 injects fuel toward the corresponding intake port 19. The fuel injected by the injectors 38 and the airflow form an air-fuel mixture. The mixture is drawn into each combustion chambers 18. The cylinder head 14 has a plurality of spark plugs 39, each of which corresponds to one of the combustion chambers 18. Each spark plug 39 is activated by spark signals distributed by a distributor 40. The distributor 40 distributes high voltage from an igniter 41 to the spark plugs 39 in synchronization with an angle of the crankshaft's rotation. Activating the spark plug 39 burns the air-fuel mixture in the combustion chambers 18. The high pressure high temperature gas in each chamber 18 causes the piston 16 to reciprocate. The reciprocation of the pistons 16 rotates the crankshaft thereby generating the power of the engine 12.

An exhaust passage 43, which includes an exhaust manifold 42 and a catalytic converter (not shown), is connected to each exhaust port 20. The burned gas in each combustion chamber 18 is discharged from the engine 12 via the exhaust passages 43.

The engine 12 is provided with various kinds of sensors that detect the running state of the engine 12. The sensors include a throttle valve opening sensor 44, a gas pedal sensor 45, an intake pressure sensor 46, a rotational speed sensor 47 and a vehicle speed sensor 48.

The throttle sensor 44 includes a pair of detectors (not shown). Each detector detects the throttle opening TA, which is a rotation angle of the axle 27 of the valve 23. The gas pedal sensor 45 also includes a pair of detectors (not shown). Each detector detects the gas pedal depression amount PA. Each pair of the detectors function to detect a malfunction of the sensors 44, 45. If the detectors of the throttle sensor 44 issue different values of throttle the opening TA, a malfunction of the sensor 44 is detected. In the same manner, if the detectors of the gas pedal sensor 45 issue different values of the gas pedal depression amount PA, a malfunction of the sensor 45 is detected.

The intake pressure sensor 46 detects the intake pressure PM in the intake passage 26. The rotational speed sensor 47 detects the crankshaft's rotational speed, or the engine speed NE, by referring to the rotation of a rotor incorporated in the distributor 40.

The vehicle 11 also includes an automatic transmission 49 that is operably coupled to the engine 12. The selector lever of the transmission 49 is selectively switched among a parking position, a reverse position, a drive position and a neutral position by the driver. A vehicle speed sensor 48 is located in the transmission 49 for detecting the speed of the vehicle 11, that is, the vehicle speed SPD.

The engine 12 includes a starter (not shown). The starter gives rotational force to the engine 12 by cranking and has a starter switch 51 that detects ON/OFF state of the starter. As known in the art, the starter is turned on or off by manipulation of an ignition switch 52 located in the passenger compartment. When the driver manipulates the ignition switch 52, the starter is actuated and the starter switch 51 outputs a starter signal STA to an electronic control unit 50, which will be described later. When the ignition switch 52 is turned off, the engine 12 stops running. Also, a warning lamp 53 is provided on the instrument panel for notifying the driver of a malfunction of the control of the throttle opening TA.

The electronic control unit (ECU) 50 controls the actuators, such as the electromagnetic clutch 28, the electric motor 28, the injectors 38 and the igniters 41. The ECU 50 has a memory 50*a*, a central processing unit (CPU) and I/O ports. The memory 50*a* stores predetermined control programs and data, based on which the CPU 50 performs various computations. The I/O ports allow the ECU 50 to transmit data to and receive data from the sensors and the actuators. The ECU 50 activates the warning lamp 53 through the I/O ports. The ECU 50 inputs detected signals from the sensors 44 to 48 and controls the actuators based on the inputted signals thereby controlling the throttle opening TA.

For example, the ECU 50 computes an optimal throttle opening (a target opening TTAH) based on a gas pedal depression amount TA detected by the gas pedal sensor 45. The ECU 50 then Actuates the motor 29 such that the actual throttle opening TA detected by the throttle valve opening sensor 44 matches the target opening TTAH.

Figure 4:
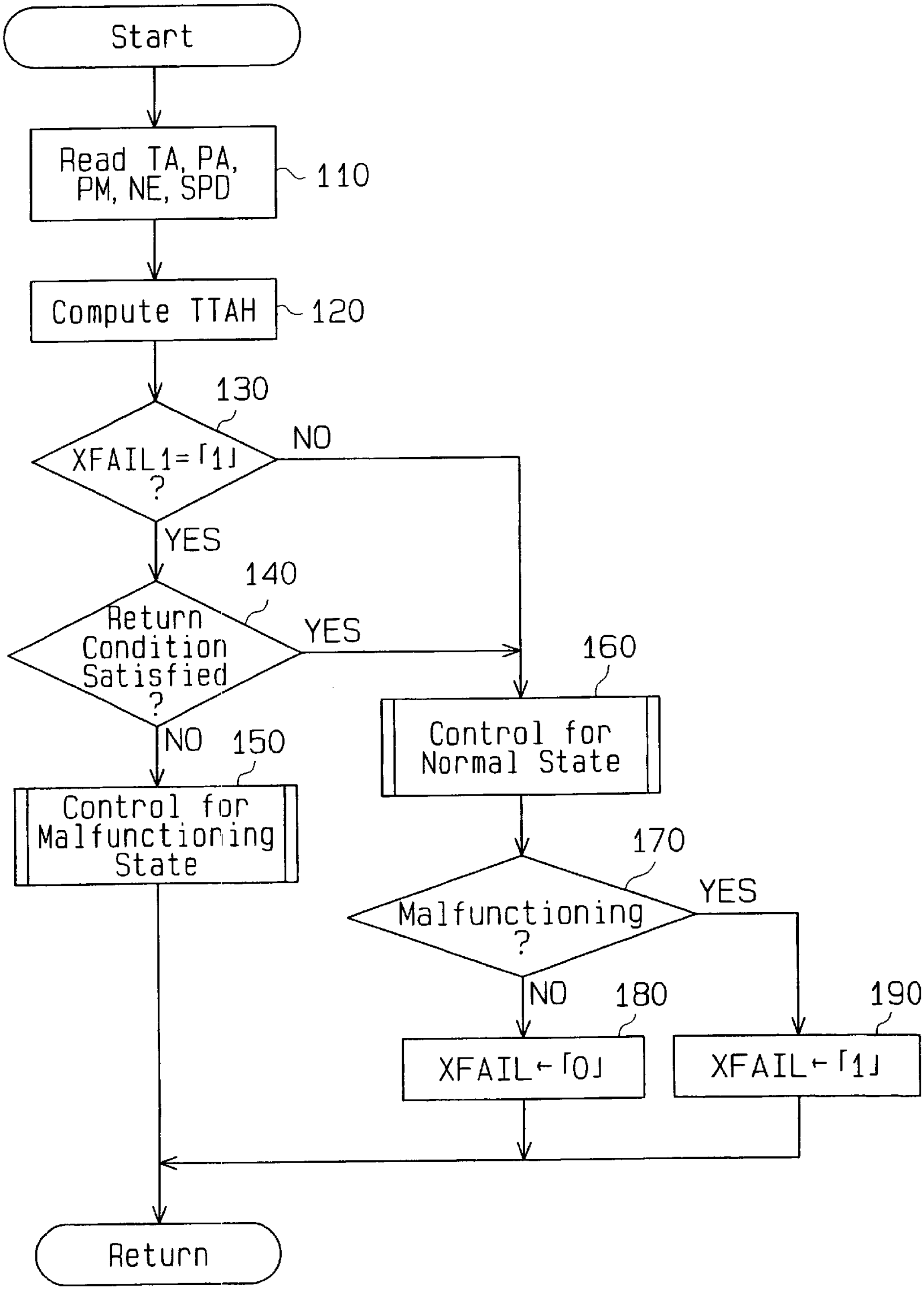
FIG. 4 is a flowchart of a throttle opening control routine according to first and second embodiments of the present invention.

Referring to the flowchart of FIG. 4, a throttle opening control routine executed by the ECU 50 will be described. The ECU 50 executes this routine at predetermined intervals after the engine 12 is started.

At step 110, the ECU 50 inputs the throttle opening TA, the gas pedal depression amount PA, the intake pressure PM, the engine speed NE and vehicle speed SPD from the sensors 44 to 48.

At step 120, the ECU 50 computes a target opening TTAH based on the pedal depression amount PA, the intake pressure PM and the engine speed NE. For computing TTAH, the ECU 50 refers to function data stored in the memory 50*a*. The function data reflects an optimal relationship between the parameters PA, PM, NE and the target opening TTAH.

At step 130, the ECU 50 judges whether an abnormality flag XFAIL has a value of one. The abnormality flag XFAIL indicates whether there is a malfunction in the electric component E.

If the flag XFAIL does not have the value of one, that is, if there is no malfunction in the electric component E, the ECU 50 moves to step 160. At step 160, the ECU 50 executes a normal state control of the throttle valve 23. That is, the ECU 50 controls the motor 29 with a current value that corresponds to the difference between the actual throttle opening TA and the target opening TTAH such that the actual throttle opening TA matches the target opening TTAH. The throttle valve 23 is thus rotated to decrease the difference between the actual throttle opening TA and the target opening TTAH.

At step 170, the ECU 50 judges whether there is a malfunction in the electric component E. That is, the ECU 50 judges whether the following conditions (1-a) to (1-g) are satisfied.

Condition (1-a): signals from the pair of detectors in the throttle valve opening sensor 44 match each other. If they do not match, one of the detectors is judged to be out of order.

Condition (1-b): signals outputted from the detectors in the throttle valve opening sensor 44 are in a predetermined range. If the value of the signals is out of the range, within which the value may vary when there is no malfunction, it is judged that there is a break in wires that connect the detectors of the sensor 44 with the ECU 50.

Condition (1-c): signals from the pair of detectors in the gas pedal sensor 45 match each other. If they do not match, one of the detectors is judged to be out of order as in the condition (1-a).

Condition (1-d): signals outputted from the detectors in the gas pedal sensor 45 are in a predetermined range. If the condition (1-d): is not satisfied, it is judged that there is a break in wires that connect the detectors of the sensor 45 with the ECU 50, as in the condition (1-b).

Condition (1-e): the difference between the throttle opening TA and the target opening TTHA is in a predetermined range. If the difference between TA and TTHA is not in the predetermined range, the motor 29 is judged not to be controlling the throttle opening TA properly. The motor 29 is thus judged to be out of order.

Condition (1-f): the gas pedal depression amount PA and the throttle opening TA satisfy a predetermined relationship. If the condition (1-f) is not satisfied, the throttle opening TA that corresponds to a given gas pedal depression amount PA is out of the range between the broken lines in FIG. 3.

Condition (1-g): the current value through the electric motor 29 is in a predetermined rang, if the current value is not in the range, it is judged that the throttle valve 23 is stuck on the wall of the intake passage 26 and an excessive torque is acting on the motor 29.

If at least one of the conditions (1-a) to (1-g) is not satisfied at step 170, the ECU 50 judges that there is a malfunction in the electric component E.

If the ECU 50 judges that there is a malfunction in the electric component E (if the determination of step 170 is positive), the ECU 50 moves to step 190. At step 190, the ECU 50 sets the abnormality flag XFAIL to one.

If the ECU 50 judged that there is no malfunction in the electric component E (if the determination of stop 170 is negative), the ECU 50 moves to step 180. At step 180, the ECU 50 sets the abnormality flag XFAIL to zero.

If the abnormality flag XFAIL has a value of one at step 130, that is, if the electric component E has been judged to have a malfunction in the previous routine or earlier, the ECU 50 moves to step 140.

At step 140, the ECU 50 judges whether a return condition, which will be described later, is satisfied. If the return condition is not satisfied, the ECU 50 moves to step 150 and executes control steps for a malfunctioning state.

At step 150, the ECU 50 de-activates the electromagnetic clutch 28 and stops feeding current to the motor 29. This disconnects axle 27 from the drive force of the motor 29. The force of the spring 34 thus directly acts on the throttle valve 23. The ECU 50 also lights the warning lamp 53 thereby notifying the driver of the malfunction in the control of the throttle opening TA.

Satisfaction of the return condition at step 140 refers to the satisfaction of the following condition (2-a).

Condition (2-a): the selector lever of the automatic transmission 49 is in the neutral position or in the parking position.

If the return condition is satisfied at step 140, the ECU 50 moves to step 160. That is, the ECU 50 does not execute the malfunctioning state control of step 150 even if there is a malfunction in the electric component E. Instead, the ECU 50 temporarily executes the normal state control at step 160. Thereafter, the ECU 50 determines whether there is a malfunction in the electric component E at step 170 and, based on the determination at step 170, sets the value of the abnormality flag XFAIL at step 180 or step 190.

After executing the processes of steps 150, 180 or 190, the ECU 50 temporarily terminates the routine.

The operation and advantages of the first embodiment will now be described. The following example pertains to a case where the throttle valve 23 is stuck on the wall of the intake passage 26 and is then freed therefrom. That is, the example pertains to a restoration of the normal control state.

Suppose the throttle valve 23 is controlled based on the difference between the current throttle opening TA and a target opening TTAH. If the valve 23 is stuck to the inner wall of the intake passage 26, the conditions (1-e), (1-f) and (1-g) are not satisfied. Accordingly, the ECU 50 sets the abnormality flag XFAIL to one. As a result, the ECU 50 executes the malfunctioning state control of the throttle valve 23.

During the malfunctioning state control of the valve 23, pressing the gas pedal 35 for a predetermined amount or more causes the projection 32*a* of the throttle lever 32 to contact the intermediate lever 31 thereby operably coupling the pedal 35 with the valve 23. Accordingly, the intermediate lever 31 is rotated by the throttle lever 32 by an amount corresponding to the depression amount PA of the gas pedal 35. The rotation of the intermediate lever 31 causes the interlocking lever 30 and the throttle valve 23 to be rotated by the force of the spring 33 in a direction opening the valve 23.

If the rotational torque of the spring 33 acting on the throttle valve 23 is great enough to rotate the valve 23 that is stuck on the inner wall of the passage 26, the valve 23 is freed from the inner wall.

In this embodiment, even if the throttle valve 23 is freed from the inner wall of the passage 26, the electric component E does not start controlling the valve 23 before the return condition is satisfied. That is, even if the valve 23 becomes rotatable, the abnormality flag XFAIL is still one. Therefore, the ECU 50 continues to execute the malfunctioning state control until the return condition (2-a) of step 140 is satisfied.

When the return condition (2-a) is satisfied, the ECU 50 starts the normal state control of the throttle valve 23. Thereafter, the ECU 50 judges whether there is a malfunction in the electric component E. In this example, the throttle valve 23 is already freed from the inner wall and the conditions (1-a) to (1-g) are satisfied. The ECU 50 therefore sets the abnormality flag XFAIL to zero. The ECU 50 then resumes the normal state control of the throttle valve 23.

The above example shows a case where the throttle valve 23 is stuck on the inner wall of the intake passage 26.

Similarly, when any of the motor 29, the throttle valve opening sensor 44 or the gas pedal sensor 45 is temporarily out of order and thereafter starts functioning again, the normal state control of the throttle valve 23 is not executed until the return condition is satisfied. If the malfunction in the electric component E has already been solved when the return condition is satisfied, the normal state control of the throttle valve 23 is executed. If the malfunction has not been solved, the malfunctioning state control of the valve 23 is continued.

In the above example, when the throttle valve 23 is freed from the inner wall, the gas pedal 35 is pressed by a certain amount and the valve 23 is kept open. The vehicle 11 is therefore likely to be moving. If the electric component E resumes controlling the opening of the valve 23 in this state, the driver may be disturbed by the unexpected change in the relationship between the depression amount of the gas pedal 35 and the engine speed. In other words, when the electric component E resumes controlling the valve 23, the throttle opening TA corresponding to the current depression amount PA of the gas pedal 35 is increased (from a point on the dashed line to a point between the broken lines in the graph of FIG. 3). If the vehicle is moving at this time, the increase in the throttle opening TA abruptly increases the engine speed NE thereby undesirably accelerating the speed of the vehicle.

However, according to this embodiment, if the return condition (2-a) is satisfied, that is, when the selector lever of the automatic transmission 49 is in the neutral position or in the parking position, the normal state control of the throttle valve 23 is resumed. Thus, even if the engine speed NE is unintentionally increased, the increase of the engine speed NE does not affect the running condition of the vehicle. This is because the power of the engine 12 is not transmitted to the drive system of the vehicle 11 when the selector lever of the transmission 49 is either in the neutral position or in the parking position.

As a results the first embodiment positively prevents the driver from feeling uncomfortable about the control of the gas pedal 35 when the control of the electric component E is resumed while the vehicle is running.

Further, in the first embodiment, the warning lamp 53 is lit when there is a malfunction in the electric component E for notifying the driver of the malfunction. Thus, the driver can quickly deal with the malfunction.

A second embodiment of the present invention will now be described.

To avoid a redundant description, like or same reference numerals are given to those components that are the same as the corresponding components of the first embodiment.

The second embodiment is different from the first embodiment in the return condition at step 140 of the throttle opening control routine. In the first embodiment, the return condition is that the selector lever of the automatic transmission 49 is either in the neutral position or in the parking position. The return condition of the second embodiment is the following condition (2-b).

Condition (2-b): the gas pedal 35 is not pressed at all (the gas pedal depression amount PA is zero) and the vehicle speed SPD is zero.

If condition (2-b) is satisfied, the ECU 50 allows the electric component E to resume the control of the throttle valve 23. Therefore, even if a malfunction in the electric component E is solved, the electric component E does not resume the control of the throttle valve 23 until the vehicle 11 is stopped. As a result, the controllability of the gas pedal 35 does not change while the vehicle 11 is moving. This embodiment thus positively prevents the driver from feeling uncomfortable about the control of the gas pedal 35.

In addition, the electric component E takes over the control of the throttle valve 23 when the gas pedal 35 is not pressed. Therefore, the throttle valve 23 is fully closed before and after the taking over of control. That is, the throttle opening TA does not change at all before and after the taking over of control. In this manner, the second embodiment prevents the speed of the vehicle from being undesirably accelerated by an increase in the throttle opening TA when the electric component E resumes the control of the throttle valve 23.

A third embodiment of the present invention will now be described with reference to FIG. 5.

To avoid a redundant description, like or the same reference numerals are given to those components that are like or the same as the corresponding components of the first embodiment.

Figure 5:
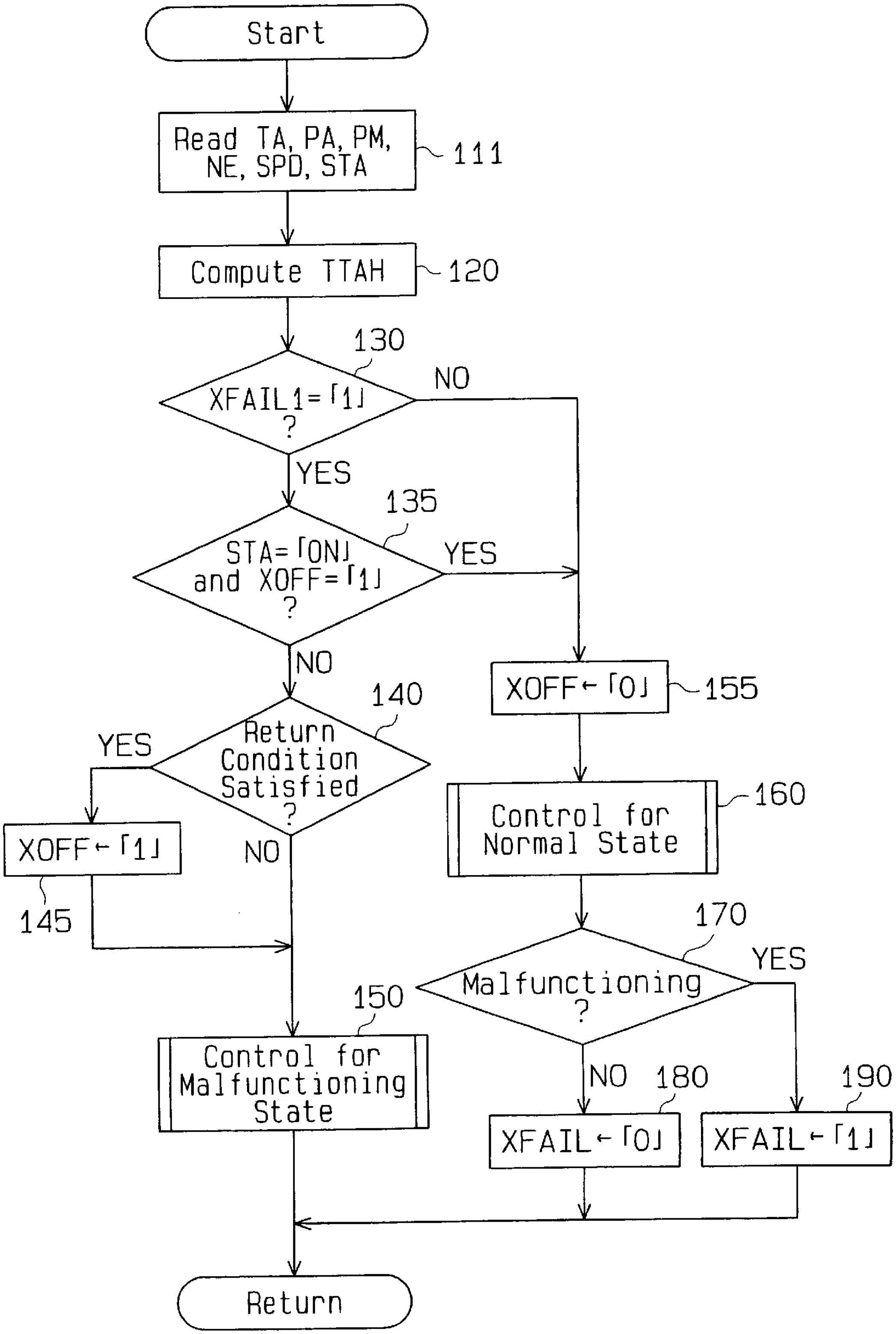
FIG. 5 is a flowchart of a throttle opening control routine according to a third embodiment of the present invention.

FIG. 5 is a flowchart showing a throttle opening control routine according to the third embodiment. In step having the same numerals as those in FIG. 4, the ECU 50 performs the same processes as in the first embodiment. The ECU 50 executes the routine at predetermined intervals from when the engine 12 is started until a predetermined time period has elapsed after the engine 12 is stopped.

At step 111, the ECU 50 inputs the throttle opening TA, the gas pedal depression amount PA, the intake pressure PM, the engine speed NE and vehicle speed SPD from the sensors 44 to 48. The ECU 50 also inputs the starter signal STA from the starter switch 51. If the ECU 50 judges that the abnormality flag XFAIL is one at step 130, the ECU 50 moves to the step 135.

At step 135, the ECU 50 judges whether the starter signal STA is ON and an engine stop determination flag XOFF has a value of one. The engine stop determination flag XOFF indicates whether the engine 12 has been stopped after a malfunction occurs in the electric component E. If the conditions of step 135 are not satisfied, the ECU 50 moves to step 140.

At step 140, the ECU 50 judges whether the following return condition (2-c) is satisfied.

Condition (2-c): the ignition switch 52 is at the OFF position. If the return condition (2-c) is satisfied (if the determination of step 140 is positive), the ECU 50 judges that the engine 12 has been stopped after a malfunction occurred in the electric component E and moves to step 145. At step 145, the ECU 50 sets the engine stop determination flag XOFF to one.

If the condition of step 140 is not satisfied, or after executing the process of step 145, the ECU 50 moves to step 150 and executes the malfunctioning state control of the throttle valve 23.

If the conditions of step 135 are satisfied, on the other hand, the ECU 50 moves to step 155. At step 155, the ECU 50 sets the engine stop determination flag XOFF to zero. At step 160, the ECU 50 judges that the engine 12 is re-started after the occurrence of a malfunction in the electric component E and thus temporarily executes the normal state control of the throttle valve 23. The ECU 50 judges whether there is a malfunction in the electric component E in step 170. At steps 180 or 190, the ECU 50 sets the abnormality flag XFAIL to one or zero in accordance with the determination result at step 170.

As described above, even if a malfunction is solved during the malfunctioning state control of the throttle valve 23, the normal state control of the valve 23 is not resumed until the engine 12 is stopped and restarted. Since the vehicle is not moving when the engine 12 is being restarted, the running condition of the vehicle 11 is not unintendedly changed. Also, it normally takes a certain time period from when the engine 12 is stopped until when the engine 12 is restarted. Therefore, even if the relationship between the throttle opening TA and the gas pedal depression amount PA is changed after the normal state control is resumed, the driver will not be disturbed about the control of the gas pedal 35.

A fourth embodiment of the present invention will now be described with reference to FIGS. 6 and 7.

To avoid a redundant description, like or the some reference numerals are given to those components that are like or the same as the corresponding components of the first embodiment.

Figure 6:
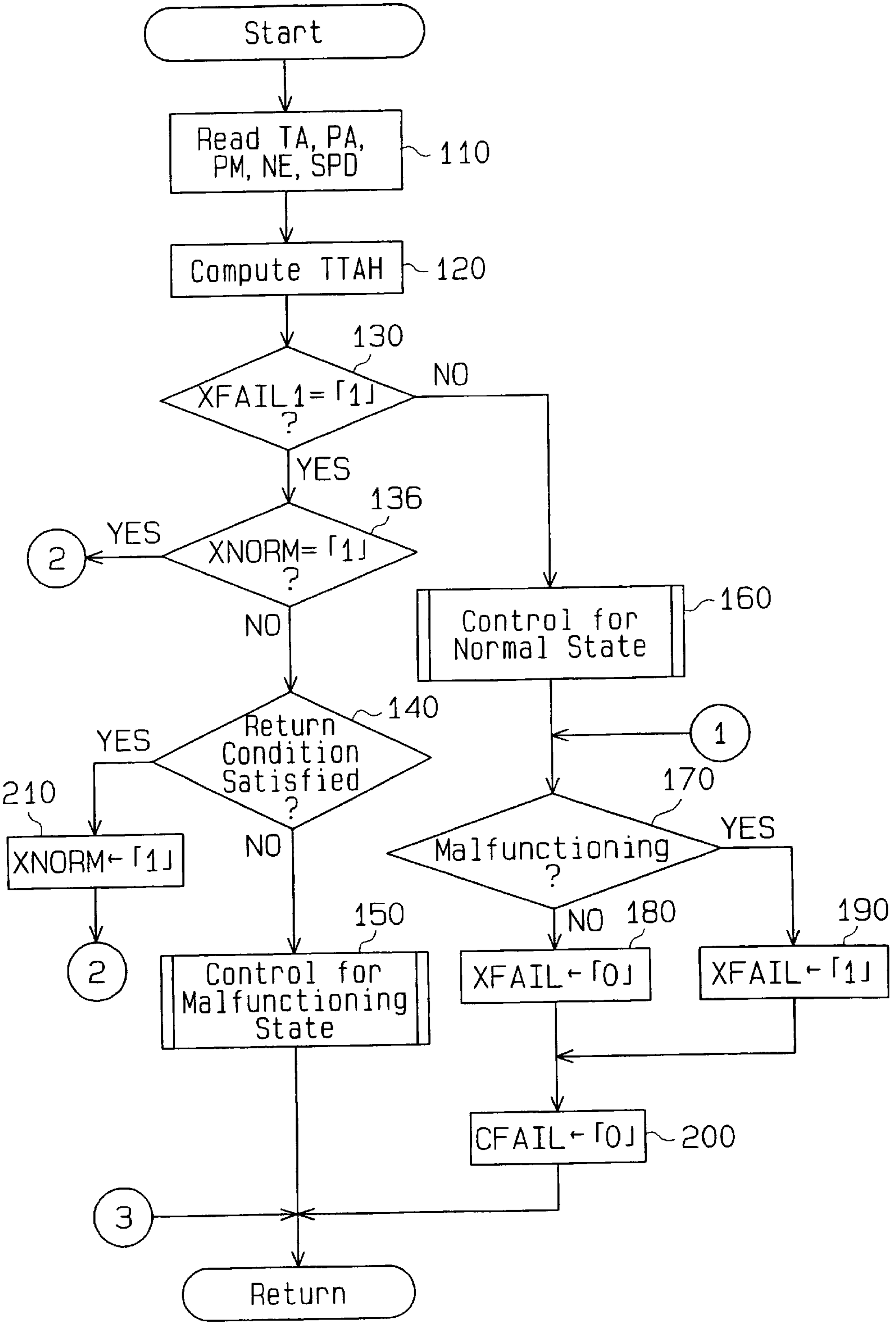
FIG. 6 is a flowchart of a throttle opening control routine according to fourth and fifth embodiments of the present invention.

FIG. 6 is a flowchart showing a throttle opening control routine according to the fourth embodiment. In steps having the same numerals as those in FIG. 4, the ECU 50 performs the same processes as in the first embodiment. The ECU 50 executes the routine of FIG. 6 with predetermined intervals after the engine 12 is started.

If the condition of step 130 is not satisfied, the ECU 50 executes the processes of steps 160 to 190. After setting the abnormality flag XFAIL to zero at step 180 or after setting the flag XFAIL to one at step 190, the ECU 50 moves to step 200. At step 200, the ECU 50 resets a return counter value CFAIL to zero.

If the condition at step 130 is satisfied, that is, if the abnormality flag XFAIL has already been set to one, the ECU 50 moves to step 136. At step 136, the ECU judges whether a return determination flag XNORM is set to one. The return determination flag XNORM indicates whether a predetermined time period has elapsed after the return condition of step 140 was satisfied in the previous routine or earlier. If the condition of step 136 is not satisfied, the ECU 50 moves to step 140.

At step 140, the ECU 50 judges whether either the return condition (2-a) of the first embodiment or the return condition (2-b) of the second embodiment is satisfied. If the determination is positive, the ECU 50 moves to step 210. At step 210, the ECU 50 sets the return determination flag XNORM to one.

Figure 7:
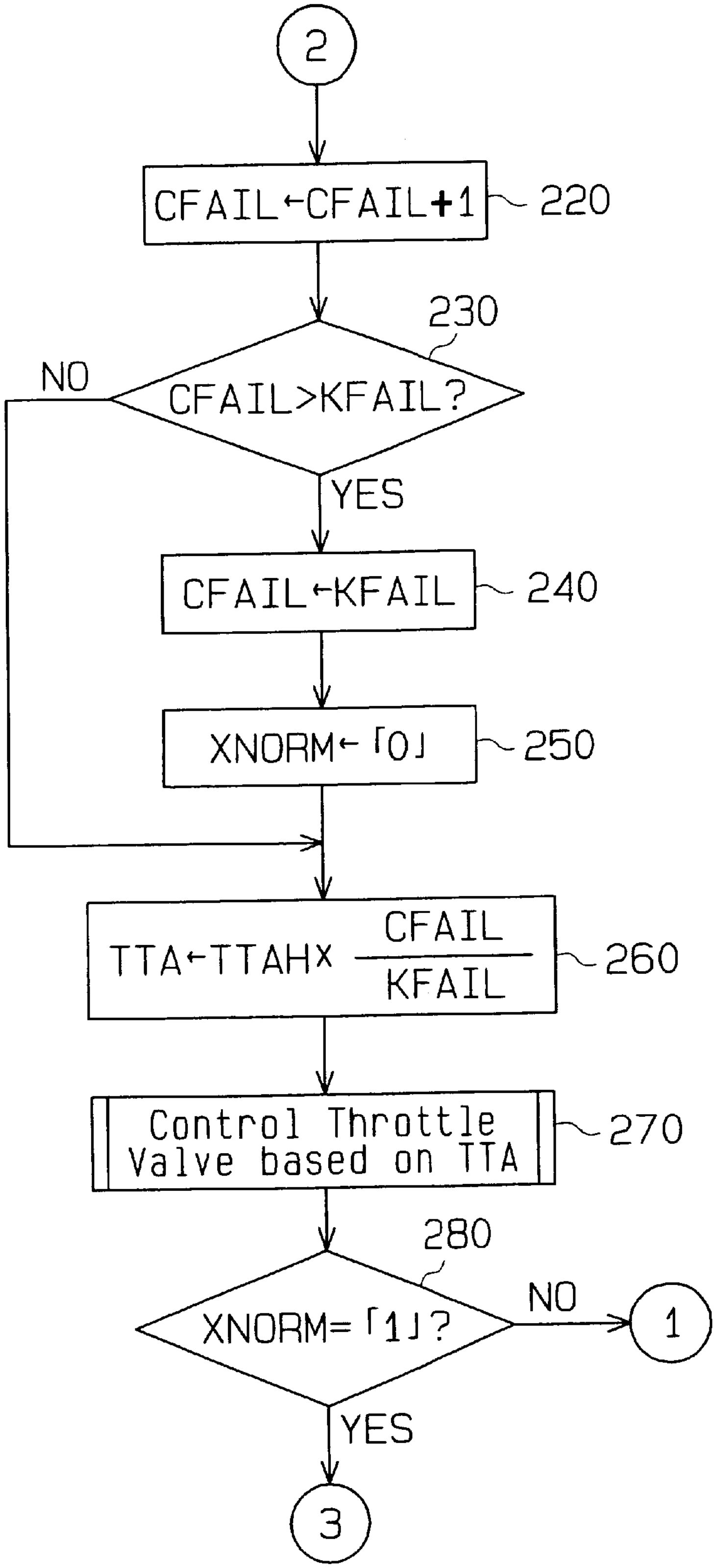
FIG. 7 is a flowchart of a throttle opening control routine according to the fourth embodiment.

If the determination is positive at step 136, or after executing the process of step 210, the ECU 50 moves to step 220 in FIG. 7. In steps 220 to 280, the ECU 50 gradually reduces the difference between an adjusted target opening TTA, which is used for controlling the valve 23, and a target opening TTAH. This process will hereafter be referred to as opening difference reduction.

At step 220, the ECU 50 increments the return counter value CFAIL by one. The value of the return counter value CFAIL shows how long the return condition of step 140 has been satisfied.

At step 230, the ECU 50 judges whether the return counter value CFAIL is greater than a determination value KFAIL. In this embodiment, the determination value KFAIL corresponds, for example, to three seconds. The return counter value CFAIL never exceeds the determination value KFAIL. If the condition of step 230 is not satisfied, the ECU 50 moves to step 260.

At step 260, the ECU 50 computes the adjusted target opening TTA based on the following equation:

$$TTA = TTAH \times (CFAIL/KFAIL) \quad (1)$$

As obvious in the equation (1), the adjusted target opening TTA increases as the return counter value CFAIL increases until TTA becomes equal to the target opening TTAH.

At step 270, the ECU 50 controls the throttle valve 23 in accordance with the adjusted target opening TTA. As the process of step 270 is repeatedly executed, the adjusted target opening TTA is gradually increased. Accordingly, the throttle opening TA is gradually increased until it is equal to the target opening TTAH.

At step 280, the ECU 50 judges whether the return determination flag XNORM is set to one. If the flag XNORM is set to one, the ECU 50 temporarily terminates the current routine.

If the condition in step 230 is satisfied, that is, if the return counter value CFAIL is greater than the determination value KFAIL, the ECU 50 moves to step 240. At step 240, the ECU 50 equalizes the return counter value CFAIL with the determination value KFAIL. Accordingly, the adjusted target opening TTA is set equal to the target opening TTAH at step 260.

At step 250, the ECU 50 sets the return determination flag XNORM to zero. Therefore, after the ECU 50 executes the processes of steps 260 and 270, the determination is negative at step 280. The ECU 50 thus moves to step 170 shown in FIG. 6. At step 170, the ECU 50 judges whether there is a malfunction in the electric component E. The ECU 50 then sets the value of the abnormality flag XFAIL either at step 180 or at step 190 based on the determination of step 170. Thereafter, the ECU 50 resets the return counter value CFAIL to zero.

As described above, if the return condition is satisfied after an occurrence of malfunction of the electric component E, the ECU 50 does not immediately resume the normal state control, in which the throttle opening TA is equalized with a target opening TTA. Instead, the ECU 50 controls the throttle opening TA to gradually approach the target opening TTAH in stages as the return counter value CFAIL increases.

Therefore, an abrupt change of the throttle opening TA, which would be caused by resumption of the normal state control of the valve 23, is prevented. This prevents a throttle opening TA corresponding to a certain pedal depression amount PA from being quickly and significantly changed when the normal state control is resumed. The driver is thus not disturbed about the feeling of the gas pedal 35 when the normal state control of the valve 23 is resumed.

In this embodiment, the opening difference reduction is executed after at least one of the return conditions (2-a) and (2-b) is satisfied. Therefore, when the opening difference reduction is started, the selector lever of the automatic transmission 49 is in the neutral position or in the parking position, or the gas pedal depression amount PA and the vehicle speed SPD are both zero. Thus, starting the opening difference reduction during the malfunctioning state control of the throttle valve 23 does not affect the running state of the vehicle. This also prevents the driver from being disturbed about the feeling of the gas pedal 35.

A fifth embodiment of the present invention will now be described with reference to FIGS. 6 and 8.

The differences from the first embodiment will mainly be discussed below, and like or the same reference numerals are given to those components that are like or the same as the corresponding components of the first embodiment.

Figure 8:
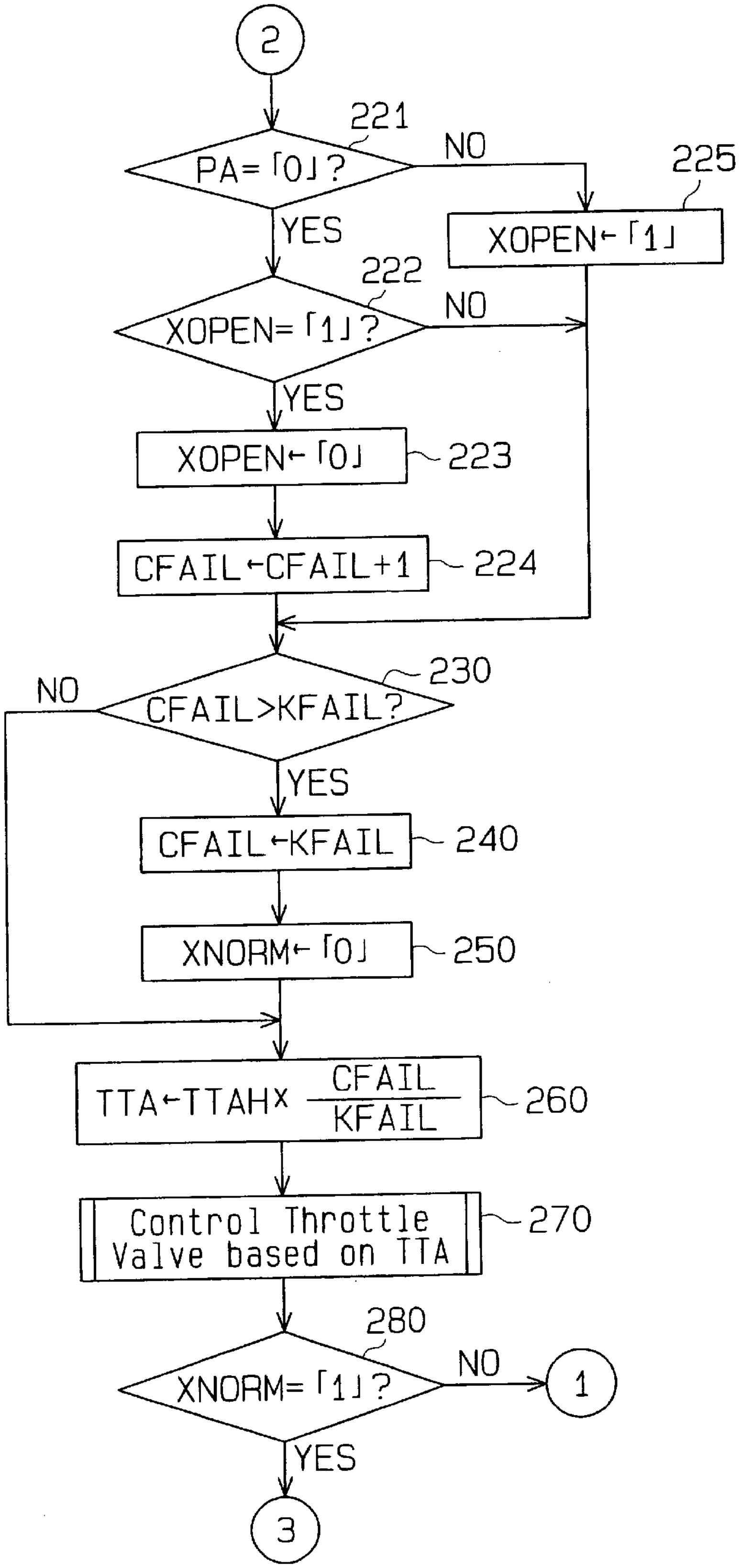
FIG. 8 is a flowchart of a throttle opening control routine according to the fifth embodiment.
Figure 9:
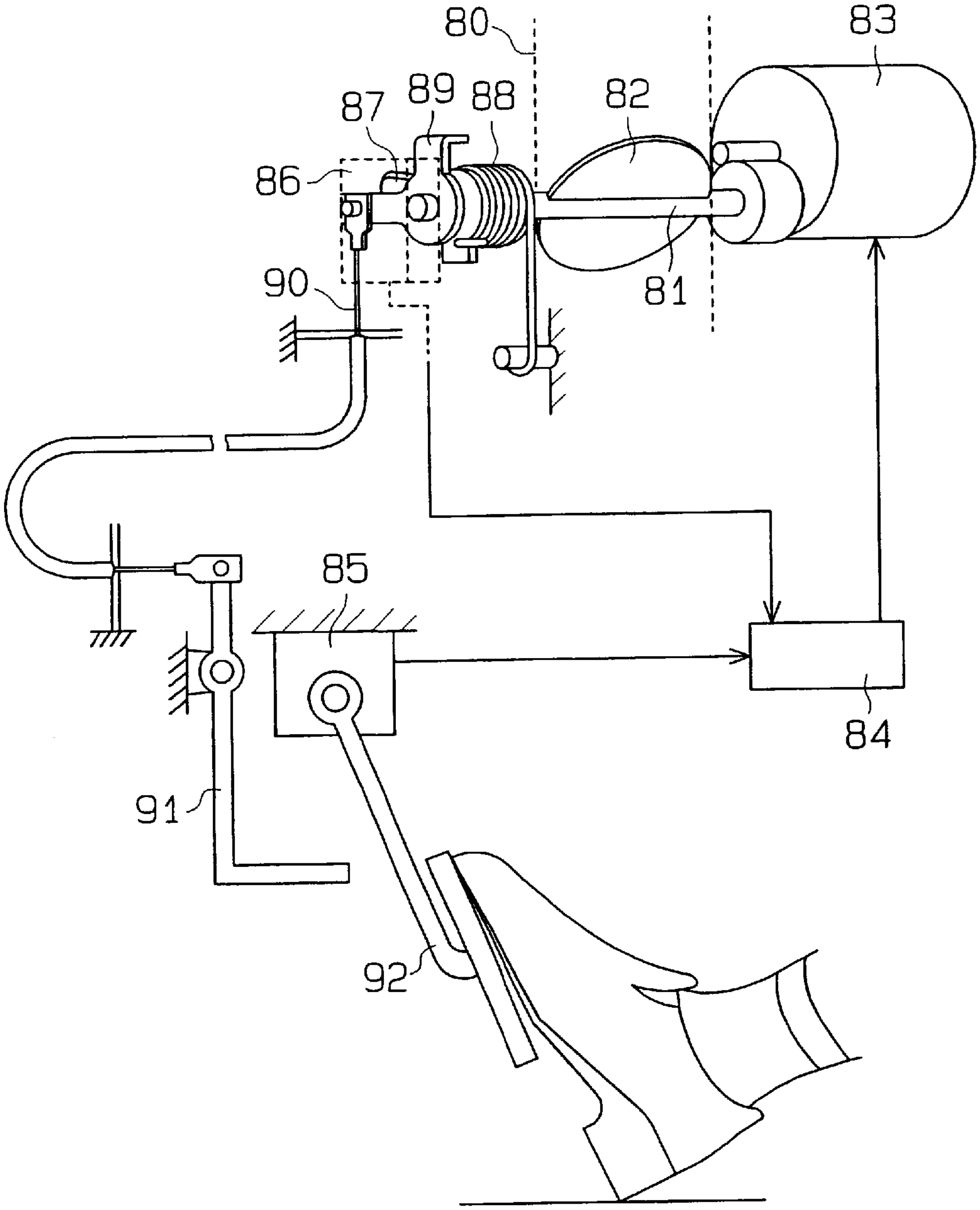
Fig.9 (Prior Art)
FIG. 9 is a diagrammatic perspective view illustrating a prior art device for actuating a throttle valve.

FIGS. 6 and 8 are flowcharts showing a throttle opening control routine according to the fifth embodiment. In steps having the same numerals as those in FIG. 7, the ECU 50 performs the same processes as in the first embodiment.

If the condition at step 136 is satisfied, or after executing the process of step 210, the ECU 50 moves to step 221 of FIG. 1. At step 221, the ECU judges whether the gas pedal depression amount PA is zero. If the condition is not satisfied, that is, if the gas pedal 35 is being pressed by the driver, the ECU 50 moves to step 225. At step 225, the ECU 50 sets an opening change flag XOPEN, which will be discussed later, to one and moves to step 230.

If the condition is satisfied at stop 221, that is, if the gas pedal 35 is not pressed at all, the ECU 50 moves to step 222.

At step 222, the ECU 50 judges whether the opening change flag XOPEN is set to one. If the flag XOPEN is one, the gas pedal depression amount PA has been changed to zero in the current routine. If the condition go step 222 is not satisfied, that is, if the pedal depression amount PA is continually zero in the previous and current routines, the ECU 50 moves to step 230.

If the condition of step 222 is satisfied, the ECU 50 moves to step 223. At step 223, the ECU 50 sets the opening change flag XOPEN to zero. At step 224, the ECU 50 increments the return counter value CFAIL by one and executes the processes of step 230 and the following steps.

As described above, when the electric component E resumes controlling the throttle valve 23, the throttle opening TA is controlled to gradually approach a target opening TTA every time the gas pedal depression amount PA becomes zero, or every time the driver releases the gas pedal 35.

Therefore, the gas pedal depression amount PA needs to be set to zero several times for resuming the normal state control of the throttle opening TA. That is, the driver has to repeatedly release the gas pedal 35. Therefore, an abrupt change of the throttle opening TA is prevented. The driver thus is not disturbed by the feeling of the gas pedal 35 when the normal state control of the valve 23 is resumed.

It should be apparent to those skilled in the art that the present invention may be embodied in many other specific forms without departing from the spirit or scope of the invention. Particularly, it should be understood that the invention may be embodied in the following forms.

(1) In the first embodiment, the return condition is that the selector lever of the automatic transmission 49 is either in the neutral position or in the parking position. However, the return condition may be satisfied only when the selector lever is in the neutral position, or only when the selector lever is in the parking position. Also, one of the conditions (2-a) of the first embodiment and (2-b) of the second embodiment may be used as the return condition.

(2) In the first to fifth embodiments, the electric component E is judged to be malfunctioning when at least one of the conditions (1-a) to (1-g) is not satisfied. However, a malfunction of the component E may be detected when two or more conditions (1-a) to (1-g) are not satisfied.

(3) In the fourth and fifth embodiments, the opening difference reduction is performed when the return conditions (2-a) and (2-b) are both satisfied. However, even it the conditions (2-a) and (2-b) are not satisfied, the opening difference reduction may be performed, for example, with predetermined intervals. Also, the opening difference reduction may be performed every time the vehicle speed SPD becomes zero. Alternatively, the opening difference reduction may be performed when the brake pedal is pressed by a predetermined amount.

(4) In the first to fifth embodiment, the throttle valve opening sensor 44 and the gas pedal sensor 45 both include a pair of detectors. However, the sensors 44 and 45 may each employ a single detector.

(5) In the fifth embodiment, the return counter value CFAIL is incremented every time the gas pedal depression amount PA becomes zero and the difference between the adjusted target opening TTAH and the target opening TTA is decreased, accordingly. However, the return counter value CFAIL may be incremented every time the vehicle speed SPD becomes zero.

(6) In the fourth and fifth embodiments, the return counter value CFAIL is incremented by a constant amount. However, the amount by which the value CFAIL is incremented may vary in accordance with parameters indicating the running state of the engine 12, such as the engine speed NE and the intake pressure PM, and the vehicle speed SPD.

(7) In the fourth embodiment, the throttle opening TA is gradually increased in stages in accordance with increase in the counter value CFAIL until TA matches the target opening TTAH. However, the throttle opening TA may be gradually changed with a constant increase rate until TA matches the target opening TTAH. Alternatively, the throttle opening TA may be changed with an increasing increase rate.

(8) In the first to fifth embodiments, the electric motor 29 is used to operate the throttle valve 23. However, an actuator using fluid pressure may be used instead.

(9) In the second embodiment, the return conditions are that the gas pedal depression amount PA is zero and the vehicle speed SPD is zero. However, the return condition may be satisfied when only the vehicle speed SPD is zero. Alternatively, the return condition may be satisfied when the gas pedal depression amount PA is zero and the selector lever of the automatic transmission 49 is in the neutral position or in the parking position.

Therefore, the present examples and embodiments are to be considered as illustrative and not restrictive and the invention is not to be limited to the details given herein, but may be modified within the scope and equivalence of the appended claims.

What is claimed is:

1. An apparatus for controlling an opening of a throttle valve to adjust an amount of air flow to an internal combustion engine mounted on a vehicle, the apparatus comprising:

an acceleration pedal arranged to be depressed by a driver;

a depression sensor for detecting a degree of depression of the acceleration pedal;

an electric component for adjusting the opening of the throttle valve with an electric power source based on a detected degree of depression of the acceleration pedal;

a mechanical component for adjusting the opening of the throttle valve in response to the degree of depression of the acceleration pedal, wherein the mechanical component is rendered operable when the electric component fails to control the opening of the throttle valve;

a first sensor for detecting a predetermined condition of the vehicle; and a controller device for returning control of the throttle valve to the electric component, after a period of control of the throttle valve by the mechanical component, only when the predetermined condition is detected by the first sensor; and an automatic transmission having shift positions for selectively connecting and disconnecting an engine power with a power train, wherein the first sensor is a shift position sensor for detecting a shift position of the transmission, wherein the controller device prohibits the electric component from resuming control of the throttle valve opening until a shift position indicating that the engine power is disconnected from the power train is detected.

2. An apparatus for controlling an opening of a throttle valve to adjust an amount of air flow to an internal combustion engine mounted on a vehicle, the apparatus comprising:

an acceleration pedal arranged to be depressed by a driver;

a depression sensor for detecting a degree of depression of the acceleration pedal;

an electric component for adjusting the opening of the throttle valve with an electric power source based on a detected degree of depression of the acceleration pedal;

a mechanical component for adjusting the opening of the throttle valve in response to the degree of depression of the acceleration pedal, wherein the mechanical component is rendered operable when the electric component fails to control the opening of the throttle valve;

a first sensor for detecting a predetermined condition of the vehicle; and a controller device for returning control of the throttle valve to the electric component, after a period of control of the throttle valve by the mechanical component, only when the predetermined condition is detected by the first sensor, wherein the first sensor detects a running condition of the vehicle, and the controller device prohibits the electric component from resuming control of the throttle valve until the vehicle is stopped.

3. The apparatus according to claim 2, wherein the controller device prohibits the electric component from resuming control of the throttle valve opening until the degree of depression of the acceleration pedal is zero.

4. An apparatus for controlling an opening of a throttle valve to adjust an amount of air flow to an internal combustion engine mounted on a vehicle, the apparatus comprising:

an acceleration pedal arranged to be depressed by a driver;

a depression sensor for detecting a degree of depression of the acceleration pedal;

an electric component for adjusting the opening of the throttle valve with an electric power source based on a detected degree of depression of the acceleration pedal;

a mechanical component for adjusting the opening of the throttle valve in response to the degree of depression of the acceleration pedal, wherein the mechanical component is rendered operable by a predetermined degree of depression of the acceleration pedal when the electric component fails to control the opening of the throttle valve;

a first sensor for detecting a predetermined condition of the vehicle;

a controller device for returning control of the throttle valve to the electric component, after a period of control of the throttle valve by the mechanical component, when the first sensor detects the predetermined condition, and wherein, upon the return of control to the electric component, the electrical control employs a gradual mode for gradually changing a throttle valve opening to a target value to avoid an abrupt change in the throttle valve opening.

5. The apparatus according to claim 4, wherein the target value corresponds to the degree of depression of the acceleration pedal.

6. The apparatus according to claim 4, further comprising an automatic transmission having shift positions for selectively connecting and disconnecting an engine power with a power train, wherein the first sensor is a shift position sensor for detecting a shift position of the transmission, wherein the controller device controls the throttle valve in the gradual mode after the first sensor detects one of a neutral shift position and a parking position.

7. The apparatus according to claim 4, wherein the first sensor detects a running condition of the vehicle, and the controller device controls the throttle valve in the gradual mode after the first sensor detects that the vehicle is stopped.

8. The apparatus according to claim 7, wherein the controller device controls the throttle valve in the gradual mode after the degree of depression of the acceleration pedal is reduced to zero.

9. The apparatus according to claim 4, wherein the controller device controls the throttle valve in the gradual mode for gradually changing the throttle valve opening to the target value each time the degree of depression of the acceleration pedal is detected as being zero.

10. A method for controlling an opening amount of a throttle valve to adjust an amount of air flow led into an internal combustion engine mounted on a vehicle, the method comprising the steps of:

detecting a depression amount of an acceleration pedal;

adjusting the opening amount of the throttle valve by an electric component based on the depression amount of the acceleration pedal;

adjusting the opening amount of the throttle valve with a mechanical component that is operable when the electric component fails to control the opening amount of the throttle valve;

detecting a predetermined condition;

returning control of the throttle valve to the electric component when the predetermined condition is detected;

detecting one of a neutral shift position and a parking shift position whereby an engine power is disconnected from a power train; and prohibiting the electric component from resuming control of the throttle valve until one of the neutral and park shift positions is detected.

* * * * *